United States Patent [19]

Harris

[11] Patent Number: 4,859,116
[45] Date of Patent: Aug. 22, 1989

[54] LEAK CONTAINMENT STORAGE FACILITY
[75] Inventor: William G. Harris, Seattle, Wash.
[73] Assignee: The Boeing Company, Seattle, Wash.
[21] Appl. No.: 828,921
[22] Filed: Feb. 12, 1986
[51] Int. Cl.⁴ .............................................. B65G 5/00
[52] U.S. Cl. ...................................... 405/52; 73/49.2; 405/54; 405/128
[58] Field of Search ............... 405/53, 54, 59; 429/12, 429/34, 35, 38, 39, 46; 109/1 S, 49.5; 220/420, 426, 466; 73/49.2 J, 40, 49.4, 49.8

[56] References Cited

U.S. PATENT DOCUMENTS

| 219,222 | 9/1879 | Coles et al. . | |
|---|---|---|---|
| 2,350,883 | 6/1944 | Duttweiler . | |
| 2,550,844 | 5/1951 | Meiller et al. . | |
| 2,796,739 | 6/1957 | Meade et al. . | |
| 2,932,170 | 4/1960 | Patterson et al. . | |
| 2,947,147 | 8/1960 | Johnson | 405/54 |
| 3,151,462 | 10/1964 | Raetzsch | 405/59 |
| 3,159,117 | 12/1964 | Rosenfeld | 109/1 S |
| 3,309,883 | 3/1967 | Waterman . | |
| 3,695,289 | 10/1972 | Capdevielle et al. | 405/59 |
| 3,848,765 | 11/1974 | Durkop | 73/49.2 T X |
| 3,881,958 | 5/1975 | Carr et al. . | |
| 3,950,958 | 4/1976 | Loofbourow . | |
| 4,121,429 | 10/1978 | Grennard . | |
| 4,335,978 | 6/1982 | Mutch | 405/54 X |
| 4,404,843 | 9/1983 | Johnson et al. | 73/49.2 T |
| 4,417,829 | 11/1983 | Berezoutzky | 405/59 |
| 4,452,868 | 6/1984 | Gibbard et al. . | |
| 4,483,318 | 11/1984 | Margen . | |
| 4,542,626 | 9/1985 | Colin | 405/53 |
| 4,561,292 | 12/1985 | Pugnale et al. | 220/426 |
| 4,708,015 | 11/1987 | Sharp . | |

FOREIGN PATENT DOCUMENTS

| 1150248 | 6/1963 | Fed. Rep. of Germany ... 73/49.2 T |
| 2735804 | 2/1979 | Fed. Rep. of Germany ... 73/49.2 T |
| 0108012 | 8/1979 | Japan ................................ 73/49.2 T |
| 1040181 | 8/1966 | United Kingdom .................. 405/59 |

Primary Examiner—Dennis L. Taylor
Attorney, Agent, or Firm—Finnegan, Henderson, Farabow, Garrett & Dunner

[57] ABSTRACT

A leak containment storage facility includes a containment vessel with an inner tank surrounded by an outer tank. Upon detection of a leak in the inner tank, the pressure within the outer tank can be increased, usually by flooding the tank, to contain the leak. This facility has special application in a deep basing environment in which a personnel area is powered by hydrogen/chlorine fuel cells. The chlorine is stored as a liquid in the inner tank. Stored water in a reservoir floods the outer tank to apply a pressure on chlorine that leaks from the inner tank and keeps the chlorine from evaporating. Generally the pressure is achieved by the hydrostatic head alone and pumps or compressors are not use.

37 Claims, 2 Drawing Sheets

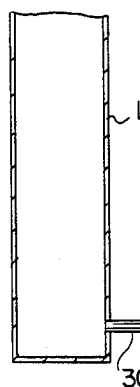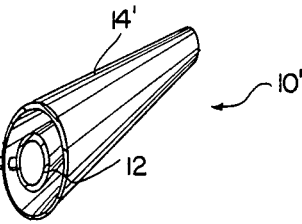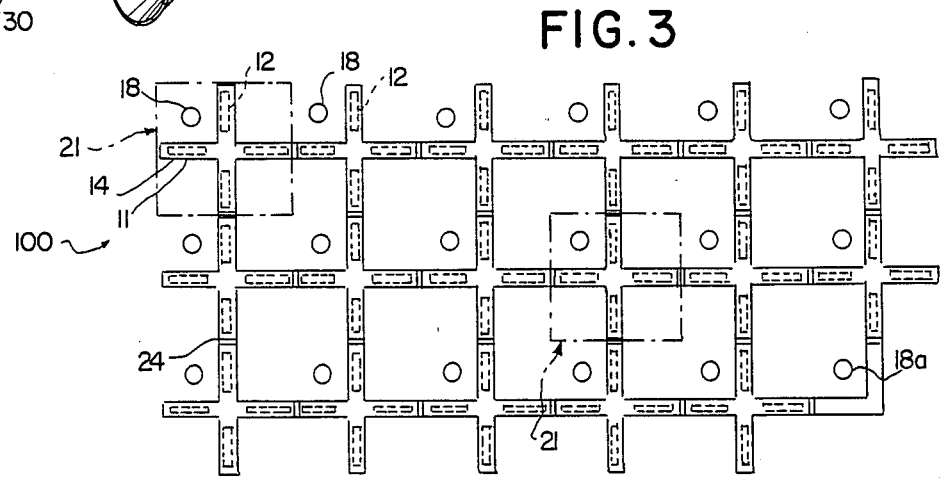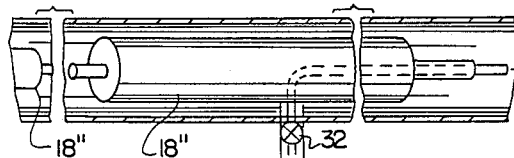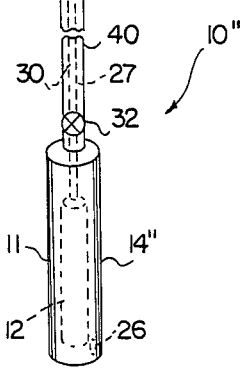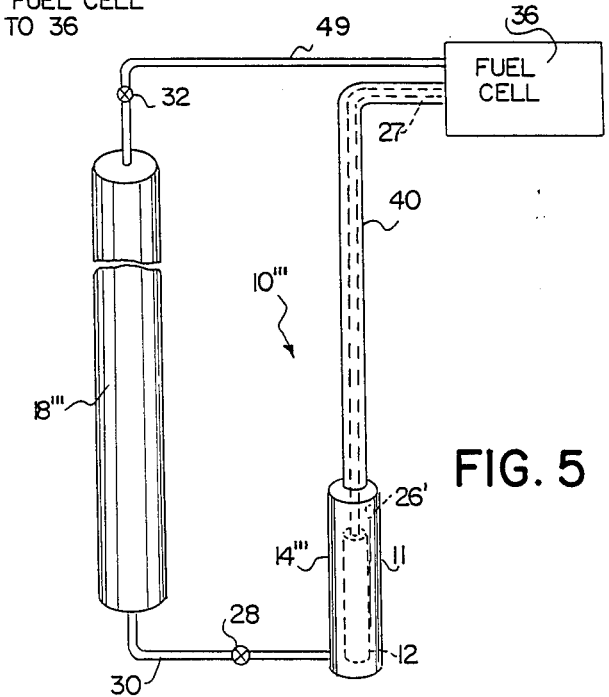

LEAK CONTAINMENT STORAGE FACILITY

BACKGROUND OF THE INVENTION

The present invention relates to storage facilities for liquids and gases and, more particularly, to methods and apparatus for controlling the escape of hazardous materials, such as chlorine, stored near personnel facilities.

The government has rights in this invention pursuant to Contract No. F04704-82-C-0038 awarded by the U.S. Air Force.

The present invention provides a safe way to store chlorine in a deep basing environment for ICBM missiles. In such a case, a control center would be buried to protect it against attack and would be isolated from the surface, relying on stockpiles of commodities for survival for a limited time.

To provide power sufficient to sustain the personnel long enough for them to "dig out" after a first strike nuclear attack, electrical power is needed and fuel cells which use hydrogen and chloride are presently envisioned to provide that power. Chlorine, however, is a hazardous material, so its storage must ensure no leakage into personnel areas. Thus, any leaks of chlorine must not only be detected quickly, but they must also be contained quickly and efficiently.

Another design criterion of the deep basing system is to minimize the loss of chlorine in the event of leakage, since the stored supply or stockpile of chlorine is limited. Thus, it is preferable that as much leaked chlorine as possible be salvaged for later use.

Furthermore, if the chlorine is stored as a liquid, for example, to conserve storage space, the leakage containment system should prevent any leaked chlorine from evaporating. This requirement is based not only on the need for efficient use of the chlorine as a fuel, but also on the need to prevent the unwanted possibility that evaporated chlorine might travel into personnel areas and cause a health hazard.

The previously available storage techniques for chlorine do not adequately meet these design criteria. For example, one proposal for storing chlorine uses a chlorine "soup," in which chlorine is kept in a weakly bound chlorine-oxygen compound in a hydrochloric acid solution within a graphite matrix. This proposal is undesirable because there is no assurance that the chlorine would be readily released at the graphite electrode of a fuel cell, or that such a "soup" could be manufactured in sufficient quantities. Another proposal, storage of chlorine as a gas, requires too much volume. Still another proposal involves storing chlorine as a chlorine hydrage, which is a complex mixture of chlorine and water. Chlorine hydrage, however must be kept refrigerated at 10° C. to maintain stability, and would not remain homogeneous while stored. Furthermore, breakdown of the hydrate would possibly release chlorine gas into personnel areas.

Therefore, an object of this invention is a safe and effective storage facility which contains leaks of a stored fluid, especially liquid chlorine.

Another object of the present invention is the safe and effective storage facility which prevents evaporation of a stored liquid in the event of a leak of that liquid.

Yet another object of this invention is a safe and effective storage facility which contains any fluid leaked from storage facility so that it can be recovered.

A still further object of the present invention is the control of hazardous leaks from chlorine storage, particularly in an undergound facility.

SUMMARY OF THE INVENTION

The present invention achieves these objects and provides significant advantages over alternative storage techniques and apparatus by using pressurizing means which increase the pressure in an outer tank surrounding an inner tank, and means for detecting a leak from the inner tank into the outer tank and for activating the pressurizing means.

The pressurizing means may include a liquid reservoir and valve means located between the reservoir and the outer tank for allowing liquid in the reservoir to enter the outer tank. The reservoir can then be constructed to apply a static pressure to leaked liquid in the outer tank when the liquid from the reservoir enters the outer tank, that pressure being sufficient to prevent evaporation of the leaked liquid. By preventing such evaporation, the storage facility of the present invention minimizes potentially dangerous health hazards and is therefore environmentally and ecologically sound.

In certain situations, the liquid stored in the inner tank and the liquid in the reservoir should be immiscible. This allows salvage of any liquid (or gas) leaked from the inner tank by keeping it contained in a known part of the outer tank. The storage facility of the present invention can thus ensure that the liquid (or gas) stored in the inner tank is available for industrial use from the containment vessel, which is particularly important for the deep basing environment contemplated for the present invention.

BRIEF DESCRIPTION OF THE DRAWINGS

FIG. 2 is a cut-away of another embodiment of the storage vessel of the present invention.

FIG. 3 is a top plan view of a storage facility of the present invention having several groups of storage vessels.

FIG. 4 is a perspective view of yet another embodiment of a storage tank and storage vessel of the present invention.

FIG. 5 is a perspective view of still another embodiment of the present invention.

DETAILED DESCRIPTION OF THE PREFERRED EMBODIMENTS

Reference will now be made in detail to preferred embodiments of the invention which are illustrated in the accompanying drawings. The following description is for the most part limited to the storage of liquid chlorine in an ICBM deep basing environment which has been described above and is described in greater detail in W. G. Harris, "Chlorine As An Oxidizer for a Closed Cycle Power Plant", presented at the 28th Chlorine Plant Managers Seminar, Houston, Texas (Feb. 13, 1985), which is incorporated herein by reference. The invention, however, has much broader applicability than the safe undergound storage of liquid chlorine.

Figure 1:
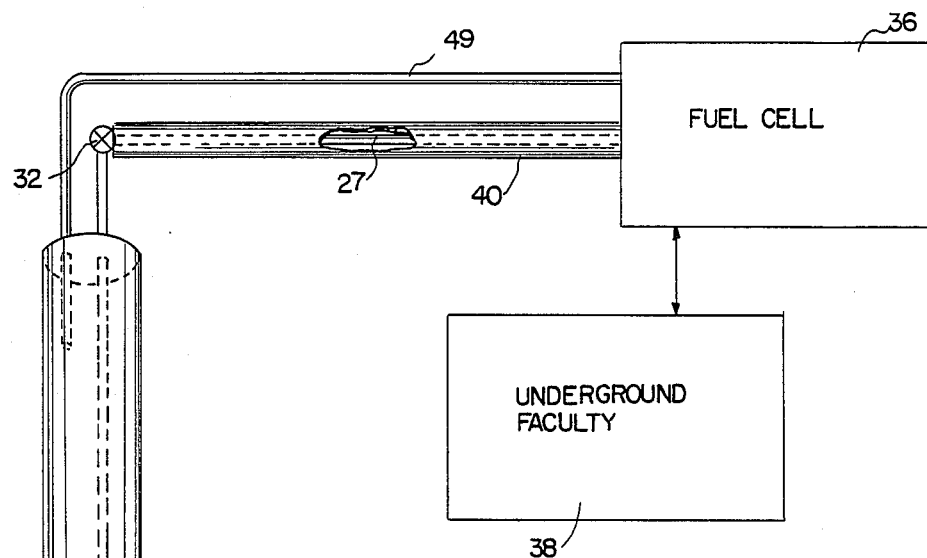
FIG. 1 is a perspective view of a preferred storage facility of the present invention.
Figure 1:
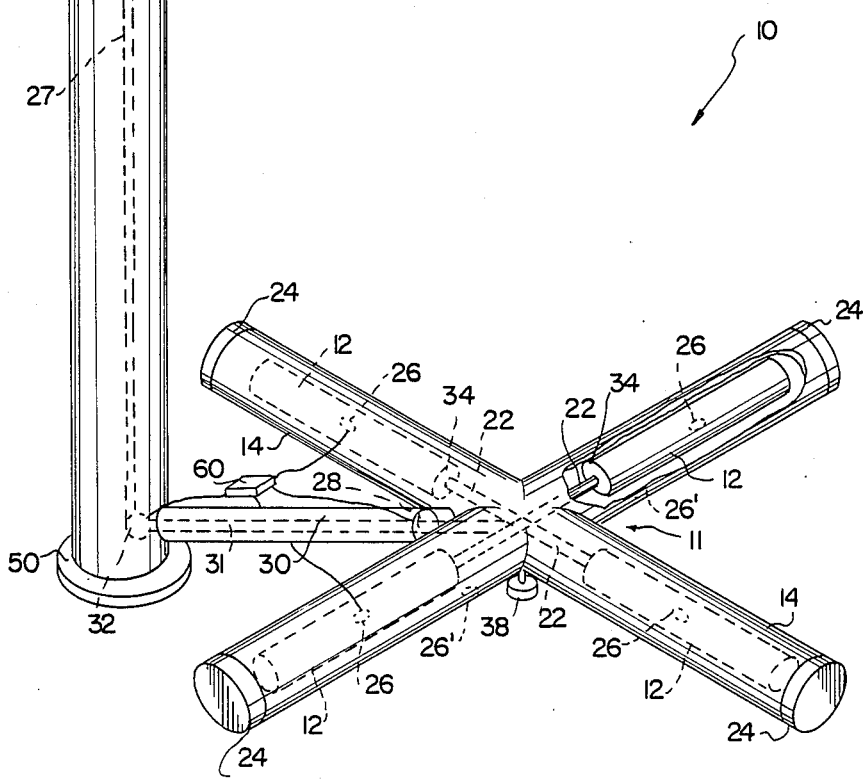

In the leak containment storage facility of FIG. 1, a containment vessel 11 for storing liquid chlorine includes an outer tank 14 and a plurality of inner tanks 12. The inner tanks, arranged in a deep basing environment along orthogonal axes to form a grid (FIG. 3), are pressure vessels capable of storing the chlorine as a liquid within the expected range of temperatures and pressures.

The outer tank 14 surrounds the inner tanks 12 and defines an annulus for collecting any chlorine that might leak from the inner tanks 12 and for allowing control of such leaks without endangering the personnel of the base or wasting (losing) a significant quantity of chlorine.

Preferably the storage facility 10 is located underground. In the storage facility 10, the outer tanks 14 can be formed directly from the tunnels or mine shafts, if, for example, they are lined with reinforcing shells known in the art to prevent chlorine from escaping into the ground. The tunnels preferably extend from drifts. One way of making the tunnels substantially liquid-tight is by activating sealing doors 24 to close off the tunnels. Sealing doors 24 can remain permanently closed or can be closed under certain circumstances, such as detection in which the a leak. FIG. 2 shows a different embodiment of outer tank 14' is a substantially fluid tight container surrounding an inner tank 12 so that the containment vessel 11 is simply a double-walled tank.

In accordance with the present invention, the storage facility 10 includes pressurizing means for increasing the pressure within the outer, and generally including a liquid reservoir 18 and a valve 28.

When valve 28 is opened, water i.e., the liquid in the reservoir through connecting conduit 30 flows from reservoir 18 into outer tank 14 and increases the pressure in outer tank 14 due to the water's hydrostatic pressure. The pressure in outer tank 14 could, however, be increased in other ways. For example, pump 29 (FIG. 2) could be used to pump liquid from reservoir 18 into outer tank 14' to increase the pressure.

When liquid chlorine stored in inner tanks 12 leaks into outer tank 14, the pressure in outer tank 14 is increased by the influx of water from the reservoir to prevent the leaked liquid chlorine from evaporating. The pressure required to accomplish this end can be determined by the vapor pressure of liquid chlorine at the temperature in containment vessel 11. The increase in pressure could also be designed for other purposes, such as to make the outer tank pressure greater than the inner tank pressure, and thereby prevent or slow further leakage, or to contain any leaked fluid and prevent such fluid from entering reservoir 18.

To provide an adequate hydrostatic pressure, the reservoir 18 can be a tall column (FIG. 1) or a storage tank (FIG. 4) located well above the containment vessel 11.

The hydrostatic pressure depends only on the height of the column of liquid. Thus, the hydrostatic pressure applied by the liquid from reservoir 18 to the leaked fluid in outer tank 14 depends on the height of the liquid in the reservoir 18 after the liquid has filled tank 14. Thus, the amount of liquid needed to prevent the stored liquid from evaporating (i.e., to prevent further leaks) can be calculated for different system configurations and volume by knowing the necessary final height.

For example, if the temperature of liquid chlorine in outer tank 14 is about 38° C. (100° F.), then a hydrostatic head (i.e., height of a column of water) of about 350 feet should be used to exert the requisite hydrostatic pressure to prevent the chlorine from evaporating.

The pressure on the liquid in outer tank 14 can be maintained either by leaving valve 28 open or by closing valve 28 after outer tank 14 has been filled. Closing valve 28 has the advantage of reducing the possibility of contaminating reservoir 18 with leaked fluid, but the system 28 must include means for recognizing when outer tank 14 is full. For example, valve 28 could include a flow meter to determine when flow from reservoir 18 has stopped.

Reservoir 18 can be located underground, such as in a raise. A raise is a vertical or inclined passageway connecting one mine working area with another. Of course, reservoir 18 may also be positioned in other types of underground formations as well as in a facility above ground.

The liquid in reservoir 18 can be selected to be substantially immiscible with the fluid stored in inner tanks 12, such as water and chlorine are. Such immiscibility allows salvage of the leaked fluid since it does not mix with the liquid from the reservoir.

The liquid in reservoir 18 can be lighter than the stored fluid, as is the case with water and chlorine. In such a case, when the liquid from the reservoir enters outer tanks, it blankets any fluid leaked into outer tank 14 and confines that fluid to the bottom of the outer tank. This approach can be used not only to prevent evaporation but also to allow removal of the leaked fluid from the bottom of the outer tank. When the reservoir liquid is lighter than the stored fluid, the arrangement of storage facility 10" shown in FIG. 4 should be used with the liquid from reservoir 18" preferably entering outer tank 14 near the top. Such an arrangement, however, is not critical.

Because the liquid chlorine is heavier than and substantially immiscible with water, when water from reservoir 18 enters outer tank 14, any liquid chlorine leaked from an inner tank 12 sinks and is contained at the bottom outer tank 14 where it can be removed from outer tank 14 for subsequent use. As shown in FIG. 1, pump 38, which could be a positive displacement sump pump, may be used for such removal. A gravity drain may also be used.

Alternatively, the reservoir liquid may be heavier than the fluid stored in inner tanks 12. If so, the reservoir liquid entering outer tank 14 forces the leaked fluid to rise to the top of tank 14 for salvage. As in the storage facility 10''' shown in FIG. 5, when the liquid and the fluid have this relationship, the liquid reservoir from 18''' preferably enters outer tank 14''' near its bottom, although this arrangement is also not critical.

In accordance with the present invention, the storage facility of this invention includes means for detecting a leak from the inner tank to the outer tank and for activating the pressurizing means. As embodied in the storage facility 10 shown in FIG. 1, sensors 26 detect a leak from the storage tanks 12 and inform controller 60. Sensors 26 can be, for example, pressure sensors located in inner tanks 12 to detect pressure drops in those tanks.

In tandem with or as an alternate to the sensors 26, detectors 26' can be located in the outer tank 14 or elsewhere in the system to detect the leaked fluid. Such sensors 26 or detectors 26' are known and can readily be selected by those of ordinary skill in the art.

When sensors 26 or detectors 26' indicate a leak, controller 60, which is shown as being connected only to certain of the sensors for simplicity, opens valve 28 or closes sealing doors 24. The design of controller 60 is conventional and would be apparent to persons of ordinary skill given the characteristics of sensors 26, detectors 26', valve, 28 and doors 24, and the interaction of those elements specified above.

Storage facility 10 can also contain one or more shut-off valves 32 coupled to the detecting means to prevent the flow of the stored fluid through output ports 34 in the storage tanks 12, when a leak is detected.

Preferably, storage facility 10 is used to provide chlorine for a chlorine fuel cell 36 through feed lines 27 and 31. Water, supplied to the fuel cell 36 through conduit 29, is used by fuel cell 36 for cooling and other purposes. After the liquid chlorine is expanded in an expansion chamber (not shown), the reaction of hydrogen and chlorine in the water matrix produces electrical power.

Various neutralizing media can also be contained in a jacket 40 around the conduits, such as conduit 27, that lead from the storage tank 12 to neutralize any chlorine that leaks from those conduits. For chlorine, an acceptable neutralizing agent such as sodium hydroxide (NaOH) could be placed in jackets 40 around the conduits to neutralize any chlorine that may leak from the conduits. Alternatively, sodium hydroxide scrubbers known in the art can be positioned around or near the conduits 27 to neutralize leaking chlorine.

The present invention can also be used to provide a leak containment storage facility with a large number of containment vessels and reservoirs. An embodiment of such a facility is shown in FIG. 3 and provides several advantages for a deep basing environment. One such advantage is the avoidance of a total loss of all power from the destruction or leakage of only some of the reservoirs or containment vessels. The same reference numbers are used in FIG. 3 as were used in FIGS. 1 and 2 to denote the same or similar elements.

In FIG. 3, underground storage facility 100 has a first number of containment vessels 11 with inner tanks 12 containing liquid chlorine or another fluid. Outer tanks 14 surround inner tanks 12. Outer tanks 14 are formed by tunnels and sealing doors 24. As in FIGS. 1 and 2, an outer tank may surround many different inner tanks or just one inner tank. Also, a number of containment vessels 11 may be considered as a group 21 of containment vessels.

Containment vessels 11 and containment vessel groups 21 can be joined together in common tunnels or drifts. Sealing doors 24 separate each containment vessel 11 or group 21.

Reservoirs 18 containing water (or another suitable liquid) are coupled to outer tanks 14. In FIG. 3, each of the reservoirs 18 can correspond to a different containment vessel 11 or group of containment vessels 21 and provide water to the outer tanks in the corresponding vessels.

As noted in the description of the embodiments shown in FIGS. 1 and 2, when a sensor or other leak detection and activation means (not shown in FIG. 3) senses a leak detected from an inner tank 12, a controller (not shown in FIG. 3) causes valve means (not shown in FIG. 3) to allow the water in at least one of the reservoirs 18 to flow into the outer tank 14 surrounding the leaking inner tank 12. The liquid reservoirs 18 can either be independent of each other or can be part of a large liquid reservoir facility, such as reservoir 18″ in FIG. 4, which is connected to several different containment vessels 11.

As FIG. 3 illustrates, there is a preferably universal reservoir 18a which does not correspond to any of the containment vessels 11 or containment vessel groups 21. The controller (not shown in FIG. 3) ensures that the liquid stored in this universal reservoir 18a is emptied into the outer tank surrounding the first leaking inner tank so that each containment vessel 11 or group 21 will afterwards always have a corresponding reservoir 18 with sufficient liquid capacity to apply the needed pressure to any outer tank 14.

In each of the embodiments shown in FIGS. 1-4, the containment vessels 11 and reservoirs 18 can be kept in shock-isolated structures known in the art. A shock-isolation platform 50 is shown schematically (although not to scale) in FIG. 1. Such shock-isolated structures are especially useful when reservoirs 18 and vessels 11 in storage facility 10 are located underground. The structures prevent the fracture or rupture of the tanks or vessels when they are exposed to a significant shock, such as an earthquake.

Generally only the inner tanks 12 are shock-isolated by mounting the tanks within the outer containment vessels 14 on pneumatic, hydraulic, or liquid springs (not shown). The water reservoirs 18 are usually cased bores without internal tanks and are some fifteen feet in diameter and about 450 feet in height, thereby being much too large for suspension on a shock-isolation platform.

As previously described, the reservoirs 18 are sized so that each contains sufficient water to allow flooding of the outer containment vessel 14 surrounding the chlorine tanks 12 while still retaining a hydrostatic pressure after flooding larger than the expected vapor pressure of the chlorine. It is anticipated that the chlorine temperature will be close to 100° F. at the depth of storage for "deep basing," and, accordingly, the water reservoirs must contain at least 350 feet of water after flooding. Conservative engineering design should be employed to ensure that the hydrostatic pressure will be adequate to prevent a hazardous diffusion of chlorine into the personnel facility. Risks are greatly reduced by keeping the chlorine from boiling, or evaporating.

As contemplated in one embodiment of the invention, a regular array of water reservoirs 18 would be contructed in rows and columns such as shown in FIG. 3. At the bottoms of these reservoirs 18, a grid of 30 foot diameter drifts could conveniently house the necessary chlorine. In the embodiment shown, the chlorine associated with each reservoir 18 is stored in four tanks, each tank being about 15 feet in diameter and 42 feet long, instead of using one tank that would hold the corresponding volume of chlorine. Separate tanks allow better containment, lower costs, and improved safety since the smaller tanks can be shock-isolated. Because each tank contains a smaller amount of chlorine, the magnitude of the problems caused by leaks from any one tank are proportionately reduced.

The amount of chlorine to be stored in conjunction with each reservoir is dictated upon the consumption of water and chlorine in the fuel cells. To ensure that there will always be water sufficient to contain a leak, the embodiment of FIG. 3 includes at least one extra water reservoir 18a under which no chlorine is stored. This reservoir 18a could always be used for leak containment. As chlorine is consumed, the water in a reservoir is also consumed. That is, the moles of chlorine in the tanks under a particular reservoir are directly proportional to the moles of water in the reservoir, so that upon consumption of the chlorine, the water will also be consumed. Initially, chlorine in tanks adjacent to the extra reservoir 18a are emptied without using any water from their associated reservoir. Water in tank 18a instead is consumed. Then, chlorine from another group is consumed while the reservoir above the now empty chlorine tanks of the first group is consumed. In this way, safety is achieved with a minimum of networking between reservoirs. Added security can be gained, however, by networking all the reservoirs together so that water from any reservoir could be used for leak containment. Such an embodiment is best illustrated in FIG. 4, where the reservoirs 18" are all interconnected and tap lines extend down to the chlorine tanks. The minimum amount of water necessary to contain a leak is consumed for containment purposes in this embodiment, and the maximum flexibility is achieved. This embodiment is best understood as a underground water tower concept where the water tank is segmented to allow isolation of portions of the water tank if leaks in the water tanks should develop. Most of the water is well above the level of the chlorine storage tanks, and pumping of water for use in the fuel cells is reduced.

In "deep basing," the enormous quantities of water that are necessary to store for the operation of the personnel area during "dig out" provide a convenient way to safeguard the personnel area aganst chlorine contamination. In other industrial applications where it is not as desirable to store large volumes of water the water tower concept or a pump system to pressurize the containment vessel by other than static pressure is undoubtedly preferred.

It will be apparent to those skilled in the art that various modifications and variations could be made in the present invention without departing from the scope and content of the invention. This invention is in no way limited to the deep basing environment or to underground storage of chlorine. The invention is also not limited to the particular arrangement of elements shown in the figures. For example, the arrangement of containment vessels and reservoirs can be modified to accommodate different storage needs, terrain, etc. The present invention includes all such modifications and variations falling within the spirit and scope of the general inventive concept.

What is claimed is:

1. A leak containment storage facility comprising:
  (a) a containment vessel including an inner tank and an outer tank that surrounds said inner tank;
  (b) pressurizing means connected to the outer tank for increasing the pressure within said outer tank;
  (c) means associated with with vessel for detecting a leak from said inner tank to said outer tank and for activating said pressurizing means in response to detecting the leak;
  (d) a jacketed feed line, including inner and outer conduits, connected to the inner tank for withdrawing fluid from the inner tank; and
  (e) neutralizing means within the outer conduit of the jacketed feed line for neutralizing fluid that leaks from the inner conduit to the outer conduit.

2. The facility of claim 1 wherein said pressurizing means includes a liquid reservoir and valve means located between said reservoir and said outer tank for allowing liquid from said reservoir to enter said outer tank.

3. The facility of claim 1 wherein the detecting and activating means includes a sensor responsive to a predetermined condition within said vessel and a controller coupled between said sensor and said pressurizing means for activating said pressurizing means in response to detection of said predetermined condition by said sensor.

4. The facility of claim 3 wherein said pressurizing means includes a liquid reservoir and valve means connected to said controller and located between said reservoir and said outer tank for allowing liquid from said reservoir to enter said outer tank upon activation by said controller.

5. The storage facility of claim 3 wherein said inner tank contains a fluid and wherein said detecting and activating means includes a sensor for detecting the presence of said fluid in said outer tank.

6. The storage facility of claim 3 wherein said detecting and activating means includes a pressure sensor for detecting pressure loss in said inner tank.

7. The storage facility of claim 2 wherein the pressure increase in said outer tank is due to the static head of the liquid in said reservoir.

8. The storage facility of claim 1 wherein said pressurizing means includes a liquid reservoir and pump means located between said reservoir and said outer tank for forcing liquid from said reservoir into said outer tank.

9. The storage facility of claim 1 further comprising:
  a shut-off valve in the inner conduit of the jacketed feed line and adapted to be activated by said detecting and activating means to prevent flow of fluid through the inner conduit.

10. The storage facility of claim 1, further comprising means, associated with said outer tank, for withdrawing fluid from said outer tank.

11. The storage facility of claim 10 wherein said fluid withdrawing means includes a pump.

12. The storage facility of claim 1 wherein said inner tank contains a fluid and wherein said pressurizing means includes a reservoir containing a liquid which is substantially immiscible with said fluid.

13. In an underground facility adapted to be isolated completely from the surface environment and to be self-sufficient for a predetermined time period by relying on stockpiles of essential commodities, a chlorine storage facility comprising:
  (a) at least one water reservoir filled with water to a predetermined height;
  (b) at least one storage tank for liquid chlorine positioned in a draft below the height of water in the reservoir; and
  (c) containment means coupling said water reservoir to said storage tank and including
    (i) a containment vessel surrounding the storage tank,
    (ii) a sensor for detecting the presence of chlorine in the containment vessel, and
    (iii) control means connected between the sensor and the reservoir for flooding the containment vessel with water from the reservoir upon detecting chlorine in the containment vessel, such that the water provides sufficient pressure to prevent any chlorine in the containment vessel from evaporating.

14. The chlorine storage facility of claim 13 wherein the pressure in said containment vessel is provided solely by the hydrostatic head of said water in said reservoir.

15. The facility of claim 13 wherein the water reservoir is located in at least one raise, said chlorine storage tank is located in a drift, and said control means includes valve means to direct water from said reservoir to said containment vessel.

16. The chlorine storage facility of claim 15 further comprising at least one fuel cell coupled to said water reservoir and said chlorine storage tank to react said chlorine with another suitable material to generate electricity for the undergound facility.

17. A method of containing leaks of a fluid comprising the steps of:
(a) storing said fluid in an inner tank surrounded by an outer tank;
(b) detecting a leak from said inner tank; and
(c) sufficiently increasing the pressure within said outer tank upon the detection of a leak to prevent the fluid in the outer tank from evaporating.

18. The facility of claim 1 wherein said detecting means is associated with said inner tank and is in communication with both (1) an annulus formed between said inner tank and said outer tank and (2) said pressurizing means.

19. A leak containment storage facility comprising:
(a) a containment vessel including an inner tank containing chlorine and an outer tank that surrounds said inner
(b) pressurizing means for increasing the pressure within said outer tank and including a reservoir filled with water;
(c) means associated with said vessel for detecting a leak from said inner tank to said outer tank and for activating said pressurizing means;
(d) a chlorine fuel cell; and
(e) first and second conduits coupled between said fuel cell and said inner tank and reservoirs, respectively, for allowing said chlorine and water to flow to said fuel cell.

20. A leak containment storage facility comprising:
(a) a containment vessel including an inner tank and an outer tank that surrounds said inner tank;
(b) pressurizing means for increasing the pressure within said outer tank;
(c) means associated with said vessel for detecting a leak from said inner tank to said outer tank and for activating said pressurizing means; and
(d) shock isolation means to permit said storage facility to withstand a predetermined shock.

21. A leak containment storage facility comprising:
(a) a containment vessel including an inner tank containing a liquid and an outer tank that surrounds said inner tank;
(b) pressurizing means for increasing the pressure within said outer tank;
(c) means associated with said vessel for detecting a leak from said innner tank to said outer tank for activating said pressurizing means;
(d) a conduit leading from said inner tank to direct the exit of liquid from said inner tank; and
(e) neutralizing scrubber means coupled to said conduit for neutralizing any of said liquid which leaks from said conduit.

22. The facility of claim 1 wherein the detecting means is located within said inner tank.

23. The facility of claim 1 wherein the detecting means is located within said outer tank.

24. The facility of claim 13 wherein the reservoir is a cased bore and wherein the containment vessel is a sealed portion of a drift.

25. The facility of claim 24 further comprising shock isolation means coupled with the storage tank.

26. A leak containment storage facility comprising:
(a) a double-walled storage vessel having inner and outer tanks for storing a fluid under pressure in the inner tank;
(b) sensor means associated with the vessel for detecting leakage of fluid from the inner tank to the outer tank;
(c) means for increasing the pressure within the outer tank upon detection of leakage, the means including:
 (i) a reservoir filled with a liquid that is substantially immiscible with the fluid;
 (ii) valve means connecting the reservoir to the outer tank and adapted for opening upon detection of leakage to allow the liquid to flood the outer tank; and
 (iii) shut-off means associated with the valve means for closing the valve means to isolate the outer tank from the reservoir after flow of fluid stops between the reservoir and the outer tank;
(d) drawdown means connected to the outer tank for emptying the liquid from the outer tank after closing the valve means; and
(e) flow control means connected to the inner tank for withdrawing fluid from the inner tank including a control valve coupled to the sensor means for closing the flow control means upon detection of leakage.

27. A chlorine storage facility for safely storing chlorine in a deep basing environment, comprising:
(a) a plurality of drifts;
(b) at least one chlorine storage tank in each drift;
(c) at least one more raise than the number of drifts, each raise including a cased bore and being filled with water to a predetermined height above the drifts;
(d) means for sealing off each chlorine storage tank in each drift and for preventing flow of chlorine from the containment are;
(e) a sensor in each containment area for detecting the presence of chlorine;
(f) means for flooding a respective containment area from a respective reservoir by draining water from the reservoir, the flooding creating a pressure in the containment area sufficient to maintain the chlorine as a liquid; and
(g) shock isolation means coupled to each chlorine storage tank.

28. The facility of claim 27 further comprising:
(a) a jacketed feed line including inner and outer conduits connected to each chlorine storage tank through a valve means for withdrawing fluid from the storage tank; and
(b) a neutralizer within the outer conduit of the jacketed feed line for neutralizing fluid that leaks from the inner conduit to the outer conduit.

29. The facility of claim 28 further comprising a controller associated with the valve means of the feed line and coupled to the sensor for shutting off the feed line upon detection of leakage to the containment area.

30. The facility of claim 29 further comprising a fuel cell connected to the feed line.

31. The facility of claim 27 wherein the drifts are arranged in a grid.

32. The facility of claim 27 wherein the predetermined height of water is at least 350 ft. above the chlorine tank.

33. The facility of claim 27 wherein the chlorine storage tank is segmented in separately isolatable units.

34. The facility of claim 27 wherein the sealing means includes sealing doors affixed within the drifts.

35. The facility of claim 28 wherein the feed line extends through the respective reservoir.

36. The facility of claim 27 wherein the reservoir is segmented into separately isolatable units.

37. The facility of claim 31 wherein the grid has the pattern shown in FIG. 3.

* * * * *

UNITED STATES PATENT AND TRADEMARK OFFICE
CERTIFICATE OF CORRECTION

PATENT NO. : 4,859,116
DATED : August 22, 1989
INVENTOR(S) : William G. HARRIS

It is certified that error appears in the above-identified patent and that said Letters Patent is hereby corrected as shown below:

Claim 19, column 9, line 22, after "inner" insert --tank;--.

Claim 27, column 10, line 38, change "are" to --area--.

Signed and Sealed this

Eighteenth Day of September, 1990

Attest:

HARRY F. MANBECK, JR.

*Attesting Officer*      *Commissioner of Patents and Trademarks*